United States Patent
Lota et al.

(10) Patent No.: US 7,784,843 B2
(45) Date of Patent: Aug. 31, 2010

(54) VEHICLE CONSOLE WITH SLIDING PANEL

(75) Inventors: Charan Singh Lota, Canton, MI (US); Kwang-Ha Kim, Farmington Hills, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 141 days.

(21) Appl. No.: 11/970,826

(22) Filed: Jan. 8, 2008

(65) Prior Publication Data
US 2009/0174211 A1 Jul. 9, 2009

(51) Int. Cl.
*B60R 7/04* (2006.01)
(52) U.S. Cl. ............................ 296/24.34; 296/37.8
(58) Field of Classification Search ............ 296/24.34, 296/24.4, 24.3, 37.1, 37.8, 37.9; 224/539, 224/926; 220/345.1, 345.4, 345.5
See application file for complete search history.

(56) References Cited

U.S. PATENT DOCUMENTS

| | | | |
|---|---|---|---|
| 3,465,614 A | 9/1969 | Reynolds | |
| 4,680,928 A | 7/1987 | Nishikawa | |
| 4,838,126 A | 6/1989 | Wilfinger | |
| 4,876,923 A | 10/1989 | Crandall | |
| 5,259,580 A * | 11/1993 | Anderson et al. | 248/311.2 |
| 5,275,069 A | 1/1994 | Baba | |
| 5,310,033 A | 5/1994 | Shibayama | |
| 5,466,036 A | 11/1995 | Stroeters et al. | |
| 5,743,010 A | 4/1998 | Zaguskin et al. | |
| 5,779,302 A * | 7/1998 | Geier et al. | 297/188.17 |
| 6,086,129 A | 7/2000 | Gray | |
| 6,203,088 B1 | 3/2001 | Fernandez et al. | |
| 6,354,651 B1 | 3/2002 | Mori | |
| 6,419,059 B1 | 7/2002 | Nobu | |
| 6,419,314 B1 * | 7/2002 | Scheerhorn | 297/188.19 |
| 6,478,204 B2 * | 11/2002 | Lange et al. | 224/539 |
| 6,499,785 B2 * | 12/2002 | Eguchi | 296/37.8 |
| 6,616,206 B2 | 9/2003 | Luginbill et al. | |
| 6,666,492 B1 | 12/2003 | Schmidt et al. | |
| 6,695,271 B2 * | 2/2004 | Bieck et al. | 248/311.2 |
| 6,702,352 B2 | 3/2004 | Nakanishi et al. | |
| 6,709,041 B1 | 3/2004 | Hotary | |
| 6,719,343 B2 * | 4/2004 | Emerling et al. | 296/24.34 |
| 6,719,344 B2 * | 4/2004 | Ono et al. | 296/24.34 |
| 6,726,267 B2 | 4/2004 | Kim et al. | |
| 6,761,388 B2 | 7/2004 | Lein et al. | |
| 6,779,769 B1 * | 8/2004 | York et al. | 248/311.2 |
| 6,788,528 B2 | 9/2004 | Enners et al. | |
| 6,796,591 B2 | 9/2004 | Yanagita | |
| 6,817,584 B2 * | 11/2004 | Ogura | 248/311.2 |
| 6,851,736 B1 | 2/2005 | Klopp, III et al. | |

(Continued)

*Primary Examiner*—H Gutman
(74) *Attorney, Agent, or Firm*—Dinsmore & Shohl LLP

(57) ABSTRACT

Embodiments of a vehicle console comprise a front storage bin having a first pair of sidewalls, a back storage bin adjacent the front storage bin having a second pair of sidewalls, a pair of tracks associated with the first and second pair of sidewalls, and a movable armrest disposed over the back storage bin, wherein the armrest is moveable to provide access to the back storage bin. The region between the movable armrest and the back storage bin is a panel housing. The vehicle console further comprises a sliding panel comprising at least one convenience apparatus wherein the sliding panel is aligned with the pair of tracks and is operable to move into the panel housing.

19 Claims, 4 Drawing Sheets

U.S. PATENT DOCUMENTS

| | | | |
|---|---|---|---|
| D502,910 S * | 3/2005 | Klopp et al. | D12/421 |
| 6,942,267 B1 * | 9/2005 | Sturt | 296/24.34 |
| D513,938 S | 1/2006 | Griffin | |
| D522,957 S * | 6/2006 | Miyashita | D12/424 |
| 7,066,436 B2 * | 6/2006 | Honda et al. | 248/311.2 |
| 7,175,217 B1 | 2/2007 | Lota | |
| 7,192,070 B2 * | 3/2007 | Radu et al. | 296/24.34 |
| 7,269,002 B1 | 9/2007 | Turner et al. | |
| 7,270,359 B2 | 9/2007 | Sparks et al. | |
| 7,287,630 B2 | 10/2007 | Takahashi | |
| 7,341,297 B2 * | 3/2008 | Nakamura et al. | 296/24.34 |
| 7,413,229 B2 * | 8/2008 | Kukucka et al. | 296/24.34 |
| 7,422,260 B2 | 9/2008 | Lota | |
| 7,469,951 B2 * | 12/2008 | Welschholz et al. | 296/37.8 |
| 7,568,601 B2 * | 8/2009 | Kogami et al. | 224/483 |
| 2002/0005424 A1 * | 1/2002 | Lange et al. | 224/539 |
| 2002/0135194 A1 | 9/2002 | Schwarz | |
| 2003/0064748 A1 | 4/2003 | Stulberger | |
| 2003/0155786 A1 * | 8/2003 | Kim et al. | 296/24.1 |
| 2005/0014536 A1 | 1/2005 | Grady | |
| 2005/0147951 A1 | 7/2005 | Rohrbach | |
| 2005/0248169 A1 | 11/2005 | Clark et al. | |
| 2006/0052144 A1 | 3/2006 | Seil et al. | |
| 2006/0058073 A1 | 3/2006 | Kim | |
| 2006/0071497 A1 | 4/2006 | Radu et al. | |
| 2006/0277555 A1 | 12/2006 | Howard et al. | |
| 2007/0090241 A1 | 4/2007 | Risse | |
| 2007/0102945 A1 | 5/2007 | Mulvihill | |
| 2007/0114974 A1 | 5/2007 | Grady | |
| 2007/0170332 A1 | 7/2007 | Akerstedt et al. | |
| 2007/0176449 A1 | 8/2007 | Kukucka et al. | |
| 2007/0182183 A1 | 8/2007 | Lota | |
| 2007/0205622 A1 | 9/2007 | Whitens et al. | |

* cited by examiner

VEHICLE CONSOLE WITH SLIDING PANEL

TECHNICAL FIELD

Embodiments of the present invention are directed to vehicle consoles having storage bins enclosed by utility sliding panels configured to hold articles and allow a user to access storage bins within the vehicle console.

BACKGROUND

Vehicle consoles are generally disposed between the front seats of a vehicle, and include a pivotal upper cover to permit access to a storage space contained therein. When designing vehicles, there is a continual desire to provide console features which yield increased comfort, storage and convenience to the drivers and passengers. For example, some vehicles include ashtrays, storage bins, cup holders and other assemblies located in or near the vehicle console. However, the location of these assemblies often interferes with one another in use and/or waste storage space within the vehicle console. Accordingly, there is a need for improved vehicle consoles that maximize usability and storage space.

SUMMARY

In accordance with one embodiment, a vehicle console is provided. The vehicle console comprises a front storage bin having a first pair of sidewalls, a back storage bin adjacent the front storage bin having a second pair of sidewalls, a pair of tracks associated with the first and second pair of sidewalls, and an armrest disposed over the back storage bin. The armrest is moveable to provide access to the back storage bin. The region between the movable armrest and the back storage bin defines a panel housing. The vehicle console further comprises a sliding panel comprising at least one convenience apparatus, wherein the sliding panel is aligned with the pair of tracks and is operable to move into the panel housing.

According to another embodiment of a vehicle console, the vehicle console comprises a storage bin having a pair of sidewalls and anterior and posterior portions, and an armrest defining up and down positions, wherein the armrest disposed over the posterior portion of the storage bin. The vehicle console further comprises a panel housing defined between the armrest and the posterior portion of the storage bin, a pair of tracks associated with the pair of sidewalls, and a sliding panel assembly having at least one convenience apparatus, wherein the sliding panel assembly is moveable with respect to the pair of tracks. The anterior portion of the storage bin is accessible and the convenience apparatus is usable when the armrest is in a down position and the sliding panel is at least partially disposed within the panel housing.

According to yet another embodiment of a vehicle console, the vehicle console comprises a storage bin. The storage bin comprises a pair of sidewalls, anterior and posterior portions, and an auxiliary port. The vehicle console also comprises an armrest defining up and down positions, wherein the armrest is disposed over the posterior portion of the storage bin, a panel housing defined between the armrest and the posterior portion of the storage bin, a pair of tracks associated with the pair of sidewalls, and a sliding panel being moveable with respect to the pair of tracks. Moreover, the sliding panel comprises a storage compartment for an electronic device. The storage compartment comprises a cord opening disposed inside the storage compartment, wherein the cord is operable to remain connected to the auxiliary port as the sliding panel moves along the pair of tracks.

These and additional objects and advantages provided by the embodiments of the present invention will be more fully understood in view of the following detailed description, in conjunction with the drawings.

BRIEF DESCRIPTION OF THE DRAWINGS

The following detailed description of specific embodiments of the present invention can be best understood when read in conjunction with the drawings enclosed herewith. The drawing sheets include.

DETAILED DESCRIPTION

Figure 1:
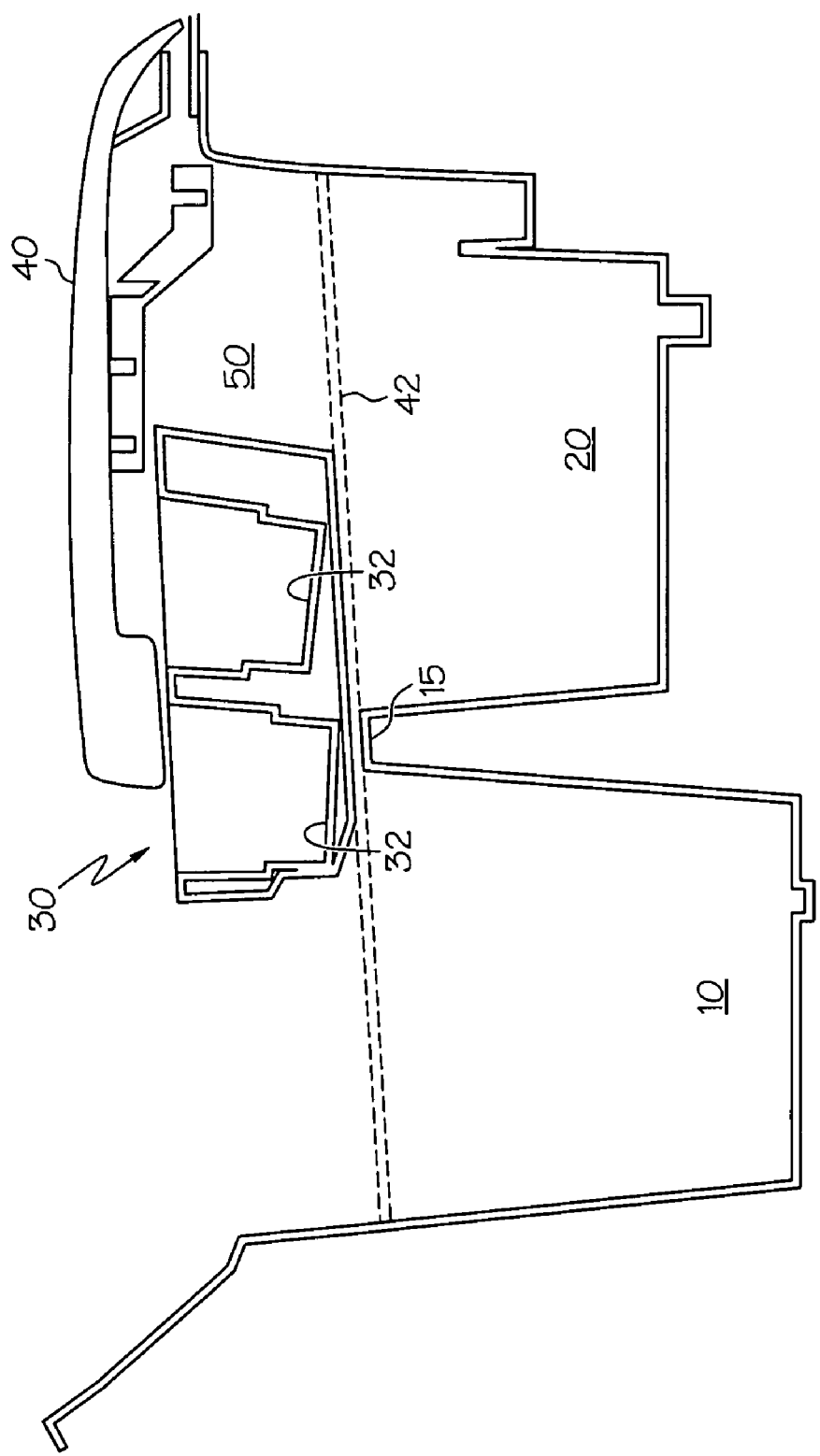
FIG. 1 is a side cross sectional view of the vehicle console according to one or more embodiments of the present invention.

Referring to FIG. 1, a vehicle console 1 in accordance with one exemplary embodiment may comprise a front storage bin 10, a back storage bin 20 adjacent the front storage bin 10, a sliding panel 30 and an armrest 40. Each of these components, as well as the operation of each will be more fully described below. As used herein, the "vehicle console" refers to the central area or panel disposed between the driver seat and the passenger seat, which can extend to or into to the dashboard of the vehicle.

Figure 2A:
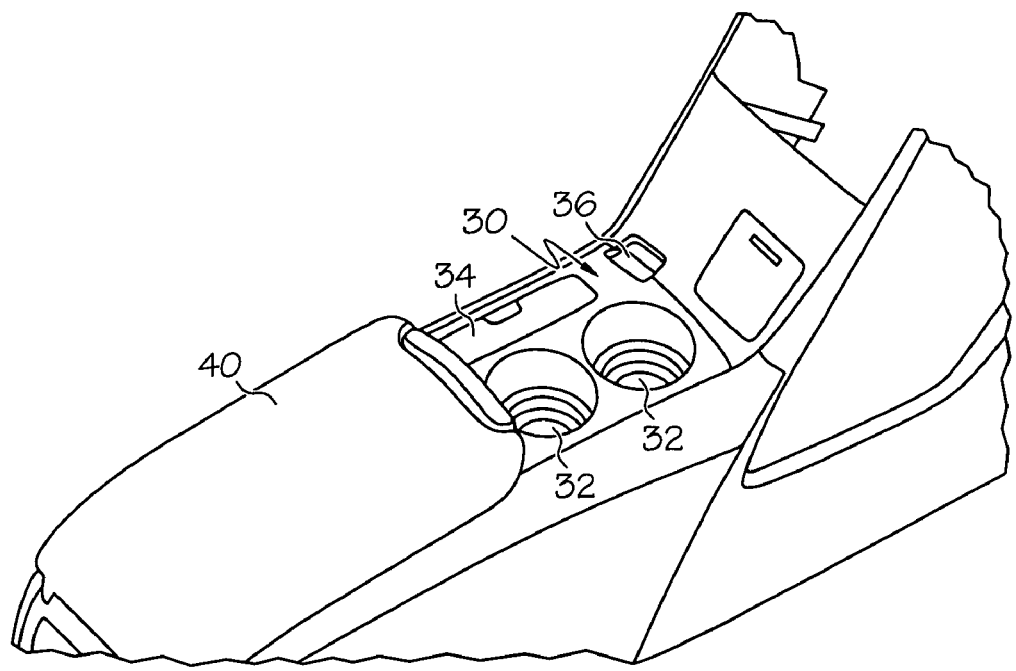
FIG. 2A is a top perspective view of the vehicle console wherein the sliding panel is covering the front storage bin according to one or more embodiments of the present invention.
Figure 2B:
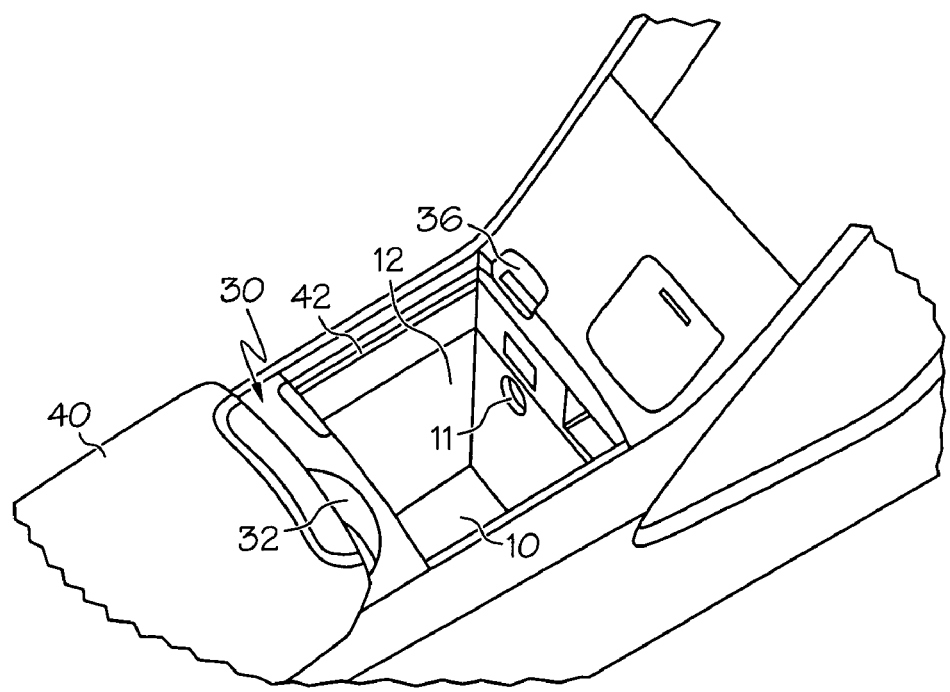
FIG. 2B is a top perspective view of the vehicle console wherein the sliding panel is disposed at least partially under the armrest such that the driver may access the front storage bin according to one or more embodiments of the present invention.

Storage bins 10 and 20 may be configured to store a variety of items. Although two bins 10, 20 are shown in the drawings and described herein, it is contemplated that one single bin comprising anterior (e.g., front) and posterior (e.g., back) portions (with or without a partition) may be utilized. Referring to FIG. 1, the front storage bin 10 and back storage bin 20 may be separated by a partition 15. FIG. 1 illustrates a partition 15 as a vertical projection; however, other embodiments, such as walls are contemplated herein. The front storage bin 10 allows for additional storage forward of the hip point of the driver, thereby reducing the degree of torso twisting required when accessing items in the front storage bin 10. Referring to FIG. 2B, it is contemplated that the front storage bin 10 or back storage bin 20 may comprise additional components, for example, an auxiliary port 11 or socket for an electronic cord.

Figure 3:
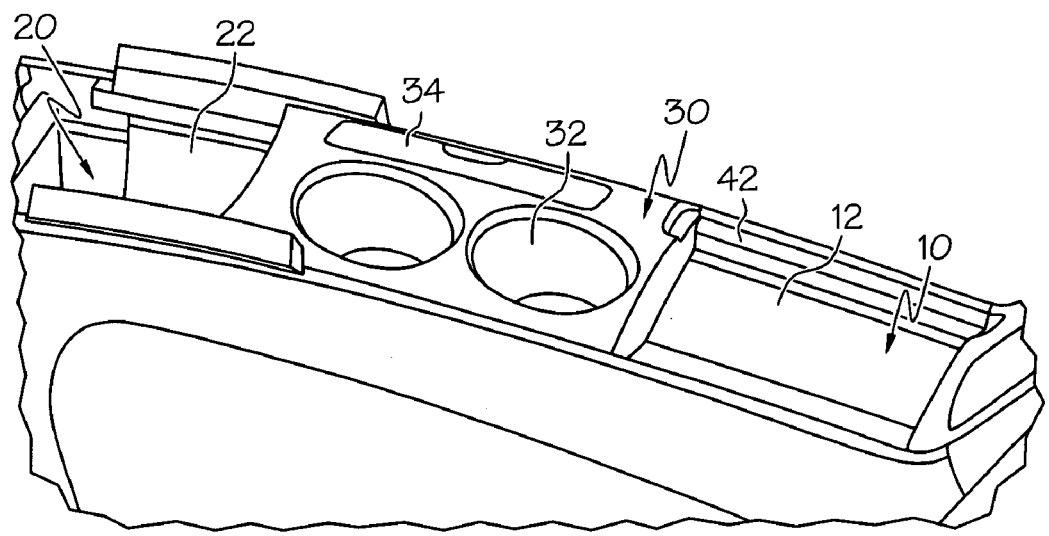
FIG. 3 is a side perspective view of the vehicle console illustrating how both the front and back storage bins may be accessed according to one or more embodiments of the present invention.

Further as shown in FIG. 1, the vehicle console 1 may comprise a pair of bin tracks 42 associated with and extending from the front storage bin 10 through the back storage bin 20. As shown in FIGS. 2B and 3, the pair of tracks 42 may be positioned on the sidewalls 12 of the front storage bin 10 and/or the sidewalls 22 of the back storage bin 20. As discussed later herein, tracks 42 may be configured to slidably receive the sliding panel 30 so that sliding panel can move relative to the storage bin(s) and the armrest 40. Of course, it should be understood that tracks 42 function to facilitate movement of the sliding panel 30, and accordingly, a number of configurations for matingly receiving the sliding panel can be utilized.

Additionally, the vehicle console 1 may comprise an armrest 40 disposed at least partially over the back storage bin 20 and spaced above the pair of tracks 42 (and ultimately, the sliding panel 30). Armrest 40 may comprise a number of materials and be configured in a variety of sizes and shapes. To provide access to the back storage bin 20, the armrest 40 may be opened by being moved upwardly, downwardly, sideways, or combinations thereof. As illustrated in the figures (e.g., FIGS. 1 and 3), armrest may be pivotally connected to a rear section of the back storage bin. As discussed later herein and referring to FIG. 1, a panel housing defines a region between the armrest 40 and the pair of tracks 42 or bin(s).

Figure 4:
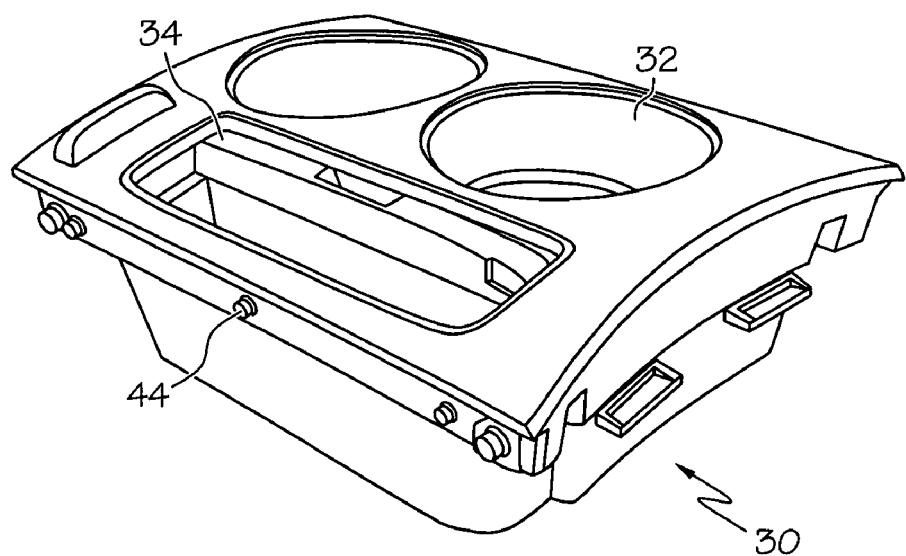
FIG. 4 is a perspective view of the sliding panel according to one or more embodiments of the present invention.

Referring to FIGS. 1, 2B, and 3, an exemplary sliding panel 30 is illustrated as being aligned with the pair of tracks 42, and moveable with respect to the pair of tracks 42 and the bin(s). As shown in FIG. 4, the sliding panel 30 may comprise one or more rollers 44 configured to engage the tracks 42 and facilitate movement with respect thereto, however, other engagement mechanisms are contemplated herein. As shown in FIG. 2A, when in a closed position, the sliding panel 30 may be disposed at least partially over the front storage bin 10, such that the sliding panel 30 conceals any items inside the front storage bin 10. In a further embodiment, the sliding panel 30 may comprise a latching mechanism 36 configured to secure the sliding panel 30 over the front storage bin 10, so as to prevent the panel from sliding during movement of the vehicle. Further as shown in FIG. 2A, the sliding panel 30 may comprise various convenience apparatuses or devices for the driver or passenger, for example, cupholders 32, ashtrays, coin holders, storage compartments 34, and combinations thereof.

Referring to FIGS. 1 and 2B, in an open position, the sliding panel 30 facilitates access to the front storage bin 10 (e.g., by moving the sliding panel 30 rearwardly along the tracks 42). As shown in FIG. 1, in the open position, the sliding panel 30 is operable to fit into the panel housing 50 between the armrest 40 and the back storage bin 20. The arrangement of the panel housing 50 over the bin(s), but under the armrest allows a driver/passenger to access the front storage bin 10, without requiring movement of the armrest 40. Particularly, the vehicle console described herein provides a functional panel with convenience apparatuses that can move to provide access to at least a portion of one or more storage bins without eliminating the use of the armrest (e.g., the panel may be moved to facilitate access to the anterior portion of bin(s) while a driver/passenger is resting an arm on the armrest).

In addition, as shown generally in the figures, the sliding panel 30 may be positioned at various locations along the tracks 42 to provide desired access, not only to the bins, but also to various convenience apparatuses. The movement of the sliding panel 30 in conjunction with the movement of the armrest 40 (where desired to access other portions of bin(s)) provides flexibility for the user. Referring to FIG. 2A, when the sliding panel 30 is in a closed position (e.g., secured to and disposed at least partially over the front storage bin 10 as shown in FIG. 2A) and the armrest 40 is in a down position, the convenience apparatuses (e.g., the cupholders 32 and storage compartments 34) are accessible, while the front storage bin 10 and back storage bin 20 is concealed. When the armrest 40 is opened and the sliding panel 30 is closed, the back storage bin 20 and the convenience apparatus are accessible, but the front storage bin 10 is concealed.

In addition, referring to FIGS. 1 and 2B, the front storage bin 10 is accessible when the sliding panel 30 is disposed at least partially inside the panel housing 50. The back storage bin 20 is concealed when the sliding panel 30 is substantially disposed within the panel housing 50, or when the armrest 40 is in a down position. Further as shown, the sliding panel 30 may be disposed a distance inside the panel housing 50 such the front storage bin 10 is accessible while at least one cupholder 32 is usable. Particularly, if the driver/passenger is utilizing the anterior cup holder and needs access to the storage bin while the armrest is in a down position, sliding panel can be slid rearwardly enough to access the storage bin without the need to remove a drink from the cup holder.

In addition, if the armrest 40 is in an up position, the front storage bin 10 is accessible while all convenience apparatuses in the sliding panel 30 are usable. Referring to FIG. 3, if the sliding panel 30 is disposed at least partially over the front storage bin 10 and at least partially over the back storage bin 20 while the armrest 40 is removed or in an up position, the driver/passenger may simultaneously have access to both the front storage bin 10 and the back storage bin 20 and may also use the convenience apparatuses of the sliding panel 30. Accordingly, the combination of the storage bin(s), sliding panel and armrest (and housing panel there between) facilitates ease of use, increased functionality and storage savings.

Figure 5:
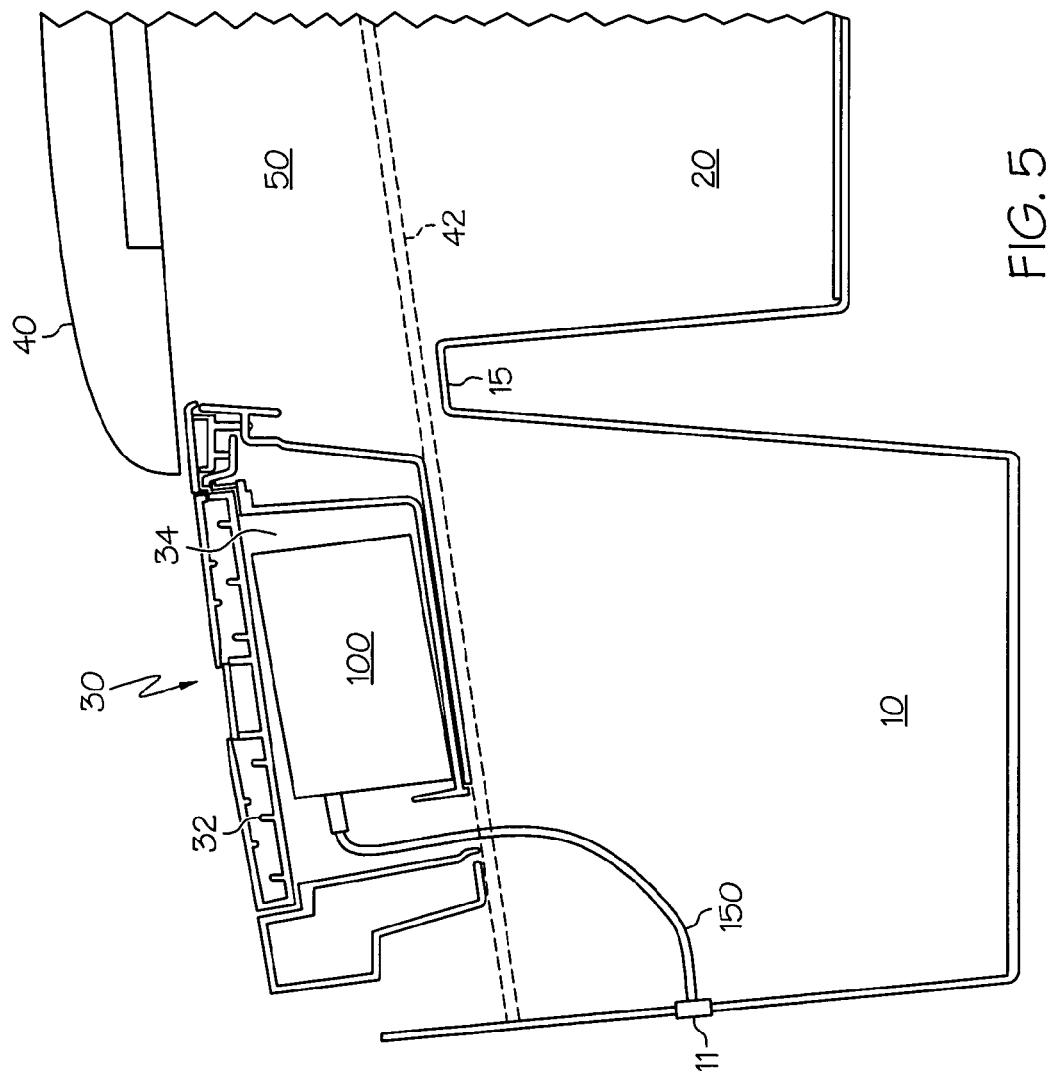
FIG. 5 is a side cross-sectional view of the vehicle console illustrating the storage compartment of the sliding panel and the cord opening therewith according to one or more embodiments of the present invention The embodiments set forth in the drawings are illustrative in nature and not intended to be limiting of the invention defined by the claims. Moreover, individual features of the drawings and the invention will be more fully apparent and understood in view of the detailed description.

Referring to a further embodiment as shown in FIG. 5, the sliding panel 130 may also comprise a storage compartment 34 for an electronic device 100 and a cord opening 37 disposed inside the storage compartment 34. The opening 37 allows an electronic cord 150 to remain connected to an auxiliary port inside the front storage bin 10 as the sliding panel 30 moves along the tracks 42 (e.g., between the front storage bin 10 and the back storage bin 20.)

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A vehicle console comprising:
   a front storage bin having a first pair of sidewalls;
   a back storage bin adjacent the front storage bin having a second pair of sidewalls;
   a pair of tracks associated with the first and second pair of sidewalls;
   an armrest disposed over the back storage bin, the armrest being moveable to provide access to the back storage bin, wherein the region between the armrest and the back storage bin defines a panel housing; and
   a sliding panel comprising at least one convenience apparatus wherein the sliding panel is aligned with the pair of tracks and is operable to move into the panel housing, wherein the front storage bin is not visible when the sliding panel is disposed over the front storage bin;
   wherein the at least one convenience apparatus comprises a fixed storage volume that is of substantially same dimension when the sliding panel is disposed over the front and back storage bins.

2. The vehicle console of claim 1 wherein the at least one convenience apparatus is a cup holder, an ashtray, a storage compartment, a coin holder, or combinations thereof.

3. The vehicle console of claim 1 wherein the front storage bin further comprises an auxiliary port operable for connection with a cord of an electronic device.

4. The vehicle console of claim 3 wherein the at least one convenience apparatus is a storage compartment for the electronic device comprising a cord opening disposed inside the storage compartment, wherein the cord is operable to remain connected to the auxiliary port of the front storage bin as the sliding panel moves along the pair of tracks.

5. The vehicle console of claim 1 wherein the front storage bin is accessible when the sliding panel is at least partially disposed within the panel housing.

6. The vehicle console of claim 1 wherein the front storage bin is accessible and the convenience apparatus is usable when the sliding panel is partially disposed within the panel housing.

7. A vehicle comprising the vehicle console of claim 1.

8. The vehicle console of claim 1, wherein the back storage bin is not visible when the sliding panel is disposed over the back storage bin with the armrest moved away from the back storage bin.

9. A vehicle console comprising:
a storage bin having a pair of sidewalls and anterior and posterior portions;
an armrest defining up and down positions, the armrest disposed over the posterior portion of the storage bin;
a panel housing defined between the armrest and the posterior portion of the storage bin;
a pair of tracks associated with the pair of sidewalls; and
a sliding panel having at least one convenience apparatus, the sliding panel being moveable with respect to the pair of tracks,
wherein the anterior portion of the storage bin is accessible and the convenience apparatus is usable when the armrest is in a down position and the sliding panel is at least partially disposed within the panel housing, wherein the anterior portion of the storage bin is not visible when the sliding panel is disposed over the anterior portion of the storage bin.

10. The vehicle console of claim 9 wherein the at least one convenience apparatus is a cup holder, an ashtray, a storage compartment, a coin holder, or combinations thereof.

11. The vehicle console of claim 9 wherein the storage bin further comprises an auxiliary port disposed at the anterior portion of the storage bin, the auxiliary port being operable for connection with a cord of an electronic device.

12. The vehicle console of claim 11 wherein the at least one convenience apparatus is a storage compartment for the electronic device comprising a cord opening disposed inside the storage compartment, wherein the cord is operable to remain connected to the auxiliary port as the sliding panel moves along the pair of tracks.

13. The vehicle console of claim 9 wherein the anterior and posterior portions of the storage bin are substantially divided by a partition.

14. A vehicle comprising the vehicle console of claim 9.

15. A vehicle console comprising:
a storage bin having a pair of sidewalls, anterior and posterior portions, and an auxiliary port;
an armrest defining up and down positions, wherein the armrest is disposed over the posterior portion of the storage bin;
a panel housing defined between the armrest and the posterior portion of the storage bin;
a pair of tracks associated with the pair of sidewalls; and
a sliding panel being moveable with respect to the pair of tracks and comprising a storage compartment for an electronic device and a cord opening disposed inside the storage compartment, wherein a cord of the electronic device is operable to extend through the cord opening and remain connected to the auxiliary port as the sliding panel moves along the pair of tracks;
wherein the panel housing is sized to receive the sliding panel and the electronic device with the cord connected to the auxiliary port as the sliding panel slides along the pair of tracks and into the panel housing beneath the armrest.

16. The vehicle console of claim 15 wherein the sliding panel further comprises one or more convenience apparatuses selected from the group consisting of cupholders, ashtrays, and coin holders.

17. The vehicle console of claim 15 wherein the anterior and posterior portions of the storage bin are substantially divided by a partition.

18. A vehicle comprising the vehicle console of claim 15.

19. The vehicle console of claim 15 wherein the anterior portion of the storage bin is not visible when the sliding panel is disposed over the anterior portion of the storage bin.

* * * * *